United States Patent
Yan et al.

(10) Patent No.: US 7,751,980 B2
(45) Date of Patent: Jul. 6, 2010

(54) METHOD AND APPARATUS FOR EVALUATING ELASTIC MECHANICAL PROPERTIES OF A TRANSVERSELY ISOTROPIC FORMATION

(75) Inventors: GongRui Yan, Beijing (CN); Peng Liu, Beijing (CN); Laurent Jammes, La Defense Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 816 days.

(21) Appl. No.: 11/644,472

(22) Filed: Dec. 22, 2006

(65) Prior Publication Data
US 2008/0178668 A1    Jul. 31, 2008

(51) Int. Cl.
*E21B 49/00* (2006.01)
*G01V 1/40* (2006.01)

(52) U.S. Cl. ............................... 702/11; 702/6; 702/14; 702/18; 367/25; 367/31; 367/32; 367/73; 367/75; 73/152.51; 73/152.52

(58) Field of Classification Search ............... 702/6, 702/11, 14, 18; 367/25, 31, 32, 73, 75; 73/152.1, 73/152.2

See application file for complete search history.

(56) References Cited

U.S. PATENT DOCUMENTS

2003/0125878 A1*  7/2003  Bakulin et al. ............... 702/14

OTHER PUBLICATIONS

Colin M. Sayers and Daniel A. Ebrom, Seismic traveltime analysis for azimuthally anisotropic media: Theory and experiment, Geophysics, vol. 62, No. 5 (Sep.-Oct. 1997); p. 1570-1582.
Leon Thomsen, Weak elastic anisotropy, Geophysics, vol. 51, No. 10 (Oct. 1986); p. 1954-1966.
Zhijing Wang, Seismic anisotrophy in sedimentary rocks, part 1: A single-plug laboratory method, Geophysics, vol. 67, No. 5 (Sep.-Oct. 2002); p. 1415-1422.
Zhijing Wang, Seismic anisotrophy in sedimentary rocks, part 2: Laboratory data, Geophysics, vol. 67, No. 5 (Sep.-Oct. 2002); p. 1423-1440.
Lev Vernik and Xingzhou Liu, Velocity anisotropy in shales: A petrophysical study, Geophysics, vol. 62, No. 2 (Mar.-Apr. 1997); p. 521-532.
Sonic Scanner, http://www.slb.com/media/services/evaluation/petrophysics/acoustic_sonic_scanner.pdf?

* cited by examiner

*Primary Examiner*—Sujoy K Kundu
(74) *Attorney, Agent, or Firm*—Hoffman Warnick LLC (57) ABSTRACT

A method of TI formation evaluation is disclosed. The method comprises receiving a plurality of borehole measurements; deriving a correlation between a first TI stiffness parameter and other TI stiffness parameters where the first and other TI stiffness parameters representing mechanical behavior of the TI formation; and computing the first and other TI stiffness parameters based on the borehole measurements and the derived correlation. The method further comprises evaluating TI formation elastic properties based on the computed first and other TI stiffness parameters. The method further comprises assuming that the shear modulus parallel to TI symmetric axis can be approximated from other moduli.

24 Claims, 7 Drawing Sheets

METHOD AND APPARATUS FOR EVALUATING ELASTIC MECHANICAL PROPERTIES OF A TRANSVERSELY ISOTROPIC FORMATION

FIELD OF THE INVENTION

The present invention relates generally to measurement and analysis of formation. More particularly, the present invention relates to a method of evaluating elastic properties of a transversely isotropic formation.

BACKGROUND OF THE INVENTION

It is well known that the laminated formation rock presents anisotropic mechanical properties. This anisotropic behavior is due to formation's sedimentary structures, such as the fine layers, oriented fissures/fractures, or anisotropy fibers/grains. The effects of this anisotropy on seismic shear anisotropy have been well documented since the 1970's, e.g. "Weak Elastic Anisotropy" by Leon Thomsen (Geophysics, Vol. 51, 1986). One common form of the anisotropy model, the Transversely Isotropic (TI) model, has been widely used in geophysical and geomechanical applications, e.g. "A model for bedding related formation failure" by Atkinson, C. and Bradford, 2001 (I.D.R.: OFSR/RN/2001/005/RDV/C). However, one of the major difficulties constraining the applications of the anisotropy model is how to determine the elastic constants from seismic or borehole sonic measurements. This constraint effects even the simplest anisotropy models, such as the TI model, with five independent elastic constants.

Recently, with the development of measuring tools, the borehole's four velocities (a compressional velocity $V_P$, a tube wave velocity $V_T$, a shear horizontal wave velocity $V_{SH}$, and a shear vertical wave velocity $V_{SV}$) can be measured with more accuracy, for example, via Schlumberger's new sonic tool SONIC SCANNER. However, it is still impossible to determine the TI properties directly from the measured four velocities.

SUMMARY OF THE INVENTION

The current invention provides methods and apparatus for the determination of the transversely isotropic (TI) formation elastic properties directly from the borehole measurements. In accord with the objects of the invention which will be discussed in more detail below, a method of TI formation evaluation comprises receiving a plurality of borehole measurements; deriving a correlation between a first TI stiffness parameter and other TI stiffness parameters where the first and other TI stiffness parameters representing mechanical behavior of the TI formation; and computing the first and other TI stiffness parameters based on the borehole measurements and the derived correlation. The method further comprises evaluating TI formation elastic properties based on the computed first and other TI stiffness parameters. The method further comprises assuming that the shear modulus parallel to TI symmetric axis can be approximated from other moduli. The method further comprises assuming the Shear Modulus G' (parallel to TI symmetric axis) is proportional to the shear module in the plane that inclined to TI symmetric axis with about 45 degree.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE INVENTION

In the early part of the 20th century anisotropy was more a topic of scientific research than a property used in engineering design. Nye gave an excellent introduction to anisotropy in crystals from a material scientist perspective and it was in Lekhnitski's paper "Theory of Elasticity of an Anisotropic Body" [Lekhnitski, 1963], that the mechanical properties of anisotropy material was first addressed in engineering design.

We start by reviewing the classical TI theory and the relations of stiffness tensor (c) and the compliance tensor (a). This is followed by giving the variation of elastic moduli (Young' Modulus and Shear Modulus) along a specific line versus the inclination of this line to TI symmetric axis. From elastic theory, the deformation constitution of elastic medium can be described with the generalized Hook' law as:

$$\sigma_{ij} = c_{ijkl}\epsilon_{kl} \quad (i,j,k=1,2,3) \tag{1}$$

where $\sigma_{ij}$ and $\epsilon_{kl}$ are stress and elastic strain tensor respectively, and $c_{ijkl}$ is the fourth order (3×3×3×3) elastic stiffness tensor.

With the consideration that stress and strain tensors are symmetric tensors ($\sigma_{ij}=\sigma_{ji}$, $\epsilon_{ij}=\epsilon_{ji}$), the above relation can be represented with compacted indices, following Voigt's recipe:

$$\{\sigma\}=[c]\{\epsilon\} \tag{2}$$

where $$\{\sigma\}=\{\sigma_{11},\sigma_{22},\sigma_{33},\tau_{23},\tau_{31},\tau_{12}\}^T \tag{3}$$

$$\{\epsilon\}=\{\epsilon_{11},\epsilon_{22},\epsilon_{33},\gamma_{23},\gamma_{31},\gamma_{12}\} \tag{4}$$

here c is the compacted $2^{nd}$ order stiffness tensor (6×6).

Figure 1:
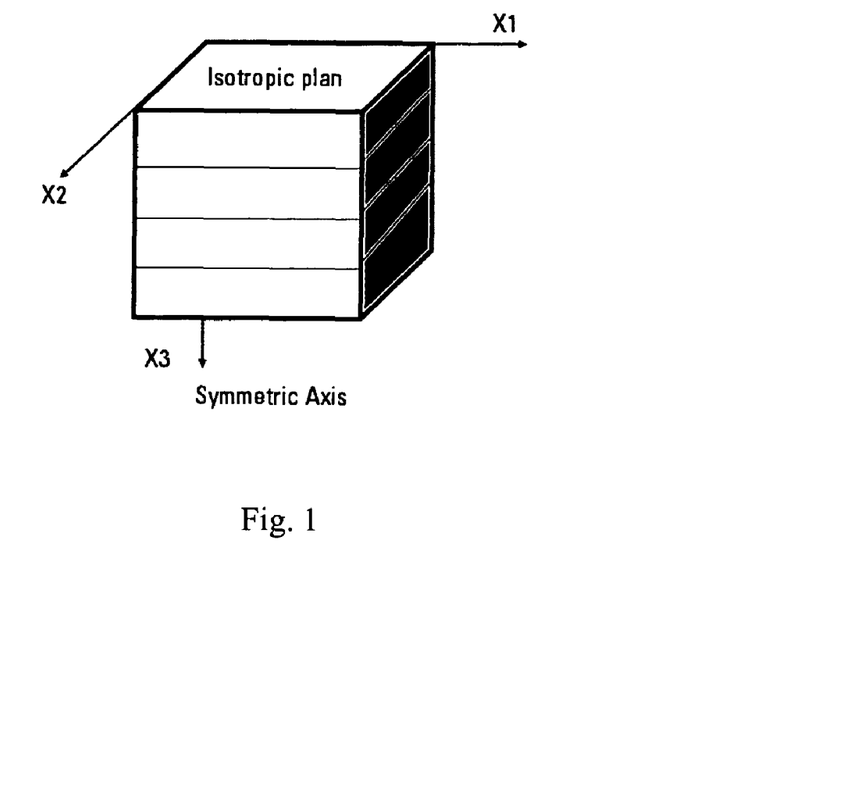
FIG. 1 is a diagram used to illustrate the transversely isotropic (TI) medium with a coordinate system.

For the TI medium, without loss of generality, we assume the symmetric axis is parallel to $X_3$ axis, as shown in FIG. 1. The full form of c can be represented as:

$$[c] = \begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & c_{66} \end{bmatrix} \quad (5)$$

The five independent constants are $c_{11}$, $c_{33}$, $c_{44}$, $c_{66}$ and $c_{13}$, and $c_{12}$ is a dependent constant where $c_{12}=c_{11}-2c_{66}$. All these parameters have been well documented in the geophysical area.

It is more convenient to rewrite the TI medium's stress and strain relation (equation (2)) as:

$$\{\epsilon\}=[a]\{\sigma\} \quad (6)$$

where a is defined as elastic compliance tensor, it relates to the stiffness tensor c as:

$$[a]=[c]^{-1} \quad (7)$$

Therefore, the elements in compliance tensor a can be represented by the elastic moduli of the medium as:

$$[a] = \begin{bmatrix} a_{11} & a_{12} & a_{13} & 0 & 0 & 0 \\ a_{12} & a_{11} & a_{13} & 0 & 0 & 0 \\ a_{13} & a_{13} & a_{33} & 0 & 0 & 0 \\ 0 & 0 & 0 & a_{44} & 0 & 0 \\ 0 & 0 & 0 & 0 & a_{44} & 0 \\ 0 & 0 & 0 & 0 & 0 & a_{66} \end{bmatrix} \quad [8]$$

$$= \begin{bmatrix} 1/E & -v/E & -v'/E' & 0 & 0 & 0 \\ -v/E & 1/E & -v'/E' & 0 & 0 & 0 \\ -v'/E' & -v'/E' & 1/E' & 0 & 0 & 0 \\ 0 & 0 & 0 & 1/G' & 0 & 0 \\ 0 & 0 & 0 & 0 & 1/G' & 0 \\ 0 & 0 & 0 & 0 & 0 & 1/G \end{bmatrix}$$

where: E is Young's modulus in the plane orthogonal to TI symmetric axis;

E' is Young's modulus parallel to TI symmetric axis;

$\upsilon$ is Poisson's ratio in the plane orthogonal to TI symmetric axis;

$\upsilon'$ is Poisson's ratio parallel to TI symmetric axis;

G is Shear modulus in the plane orthogonal to TI symmetric axis; and

G' is Shear modulus parallel to TI symmetric axis.

Figure 2:
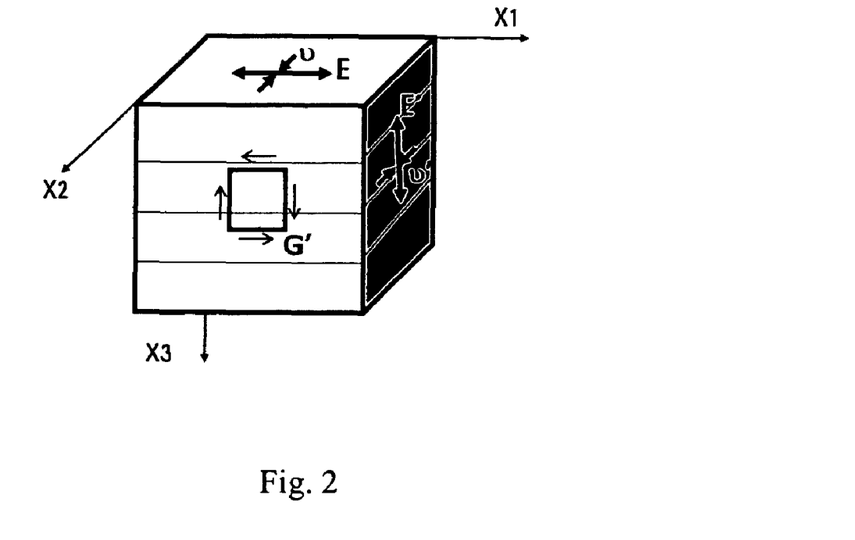
FIG. 2 is a diagram used to illustrate elastic moduli of TI medium with the same coordinate system.

The physical meanings of these elastic constants are shown in FIG. 2. The five independent elastic moduli are E, E', $\upsilon$, $\upsilon'$ and G'. The other module G is not an independent parameter, it can be expressed as:

$$G = \frac{E}{2(1+\upsilon)} \quad (9)$$

From equations (7) and (8), we can derive the relations of $C_{ij}$ and elastic moduli as:

$$E = \frac{(c_{11}-c_{13}^2/c_{33})^2 - (c_{12}-c_{13}^2/c_{33})^2}{(c_{11}-c_{13}^2/c_{33})} \quad (10)$$

$$\upsilon = \frac{(c_{12}-c_{13}^2/c_{33})}{(c_{11}-c_{13}^2/c_{33})} \quad (11)$$

$$E' = c_{33} - \frac{2c_{13}^2}{(c_{11}+c_{12})} \quad (12)$$

$$\upsilon' = \frac{c_{13}}{(c_{11}+c_{12})} \quad (13)$$

$$G' = c_{44} \quad (14)$$

Once the stiffness parameters $C_{ij}$ have been derived from sonic or seismic measurements, the elastic moduli E, E', $\upsilon$, $\upsilon'$ and G' can be computed from the above equations (10) to (14). It should be noted that the above equations are defined at the material Cartesian coordinate system ($X_3$ axis parallel to the material symmetric axis). The current invention is related to a method to derive the stiffness parameters $C_{ij}$ from sonic or seismic measurements thus further to evaluate the elastic moduli E, E', $\upsilon$, $\upsilon'$ and G'.

Figure 3:
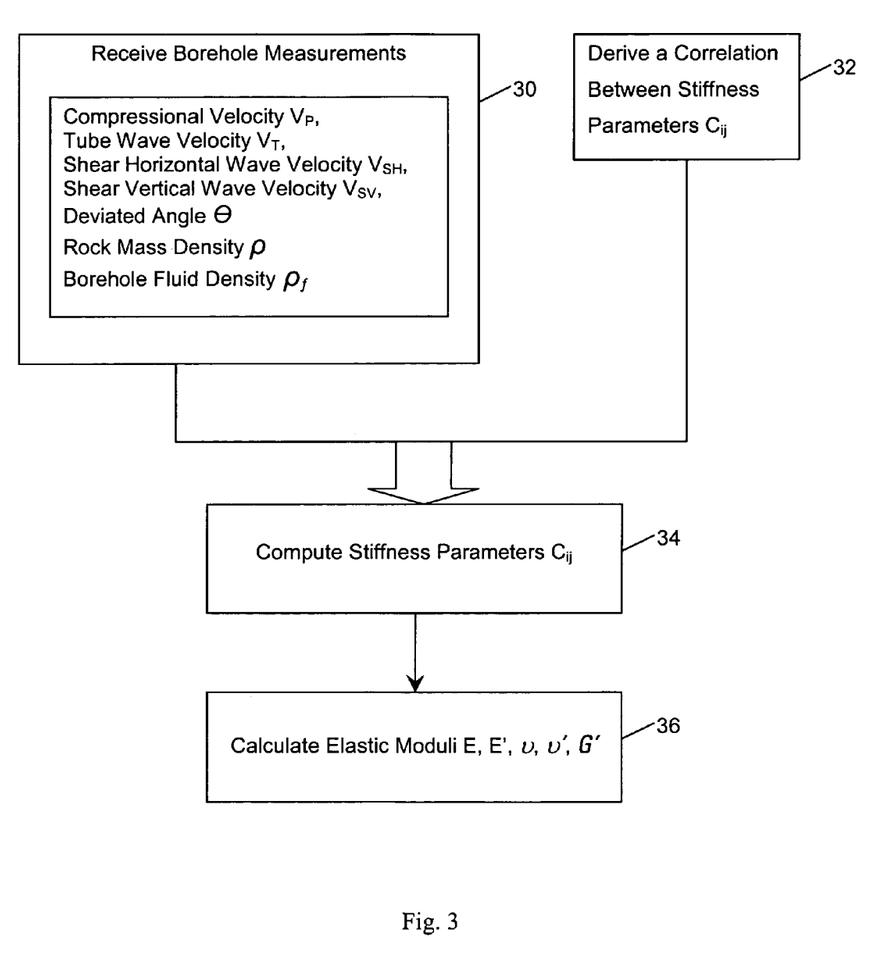
FIG. 3 is a flowchart showing steps associated with the present method, apparatus, and article of manufacture.
Figure 4:
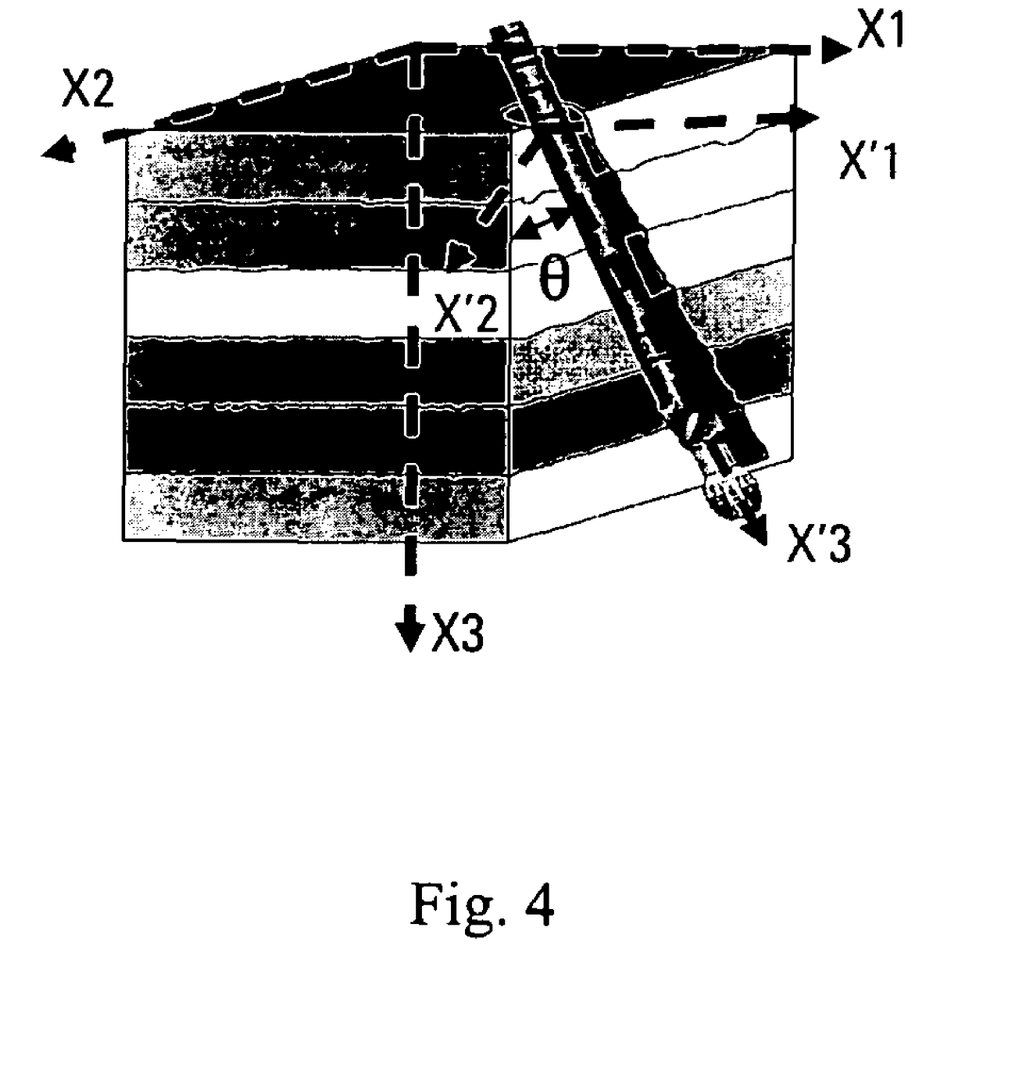
FIG. 4 is a diagram used to illustrate a borehole with a coordinate system relative to the TI formation coordinate system.

FIG. 3 shows several steps associated with the present method, apparatus and article of manufacture and provides a general overview of the invention. In the Receive Borehole Measurements Step 30, a plurality of measurements can be obtained from a deviated well. In one embodiment, the borehole measurements include borehole sonic measurements from a tool using acoustic technology. In another embodiment, the borehole measurements include borehole seismic measurements. Still in another embodiment, the borehole measurements include a formation compressional velocity ($V_P$), a tube wave velocity ($V_T$), a shear horizontal wave velocity ($V_{SH}$), and a shear vertical wave velocity ($V_{SV}$). Specifically, the four velocities are: (a) Formation compressional velocity $V_P$ from a monopole source; (b) Tube wave velocity $V_T$ from a low-frequency Stoneley dispersion; (c) Shear-horizontal (SH) wave velocity $V_{SH}$ from the low-frequency extrapolation of horizontal-polarized flexural wave dispersion; and (d) Shear-vertical (SV) wave velocity $V_{SV}$ from the low-frequency extrapolation of quasi vertical-polarized flexural wave dispersion. Still in another embodiment, the borehole measurements include an angle ($\theta$) that the borehole is deviated from formation isotropic axis, as shown in FIG. 4. Still in another embodiment, the borehole measurements include rock mass density $\rho$, borehole fluid density $\rho_f$ and fluid velocity $V_f$. In fact, the borehole measurement can be any sonic data or seismic data that represents the mechanics behavior of formation rock.

Some research has been done to build equations between borehole measurements and the TI stiffness parameters $C_{ij}$. For example, Sinha and Norris [1993] gave the equations of these four velocities with the TI elastic constants as:

$$\rho V_P^2 = c_{11}\sin^4\theta + c_{33}\cos^4\theta + 0.5(c_{13}+2c_{44})\sin^2 2\theta \quad (15)$$

$$\rho V_{sh}^2 = c_{44}(1-\sin^2\theta) + c_{66}\sin^2\theta \quad (16)$$

$$\rho V_{SV}^2 = c_{44}\cos^2 2\theta + 0.25(c_{11}+c_{33}-2c_{13})\sin^2 2\theta \quad (17)$$

$$\frac{\rho_f V_f^2 V_T^2}{(V_f^2 - V_T^2)} = c_{44}\sin^2\theta + c_{66}\cos^2\theta + \frac{1}{8}\begin{pmatrix} c_{11}+c_{33}- \\ 2c_{13}-4c_{44} \end{pmatrix}\sin^4\theta \quad (18)$$

The five unknown independent constants are $c_{11}$, $c_{33}$, $c_{44}$, $c_{66}$ and $c_{13}$. What can be obtained from the borehole measurements are $V_P$, $V_T$, $V_{SH}$, $V_{SV}$, $\theta$, $\rho$, $V_f$ and $\rho_f$. Thus the four equations (15) to (18) are not enough to solve the five stiffness parameters $c_{11}$, $c_{33}$, $c_{44}$, $c_{66}$ and $c_{13}$ and further the elastic moduli E, E', $\upsilon$, $\upsilon'$ and G' based on borehole measurements.

In the Derive a Correlation Step 32, we derive a correlation between the five stiffness parameters $c_{11}$, $c_{33}$, $c_{44}$, $c_{66}$ and $c_{13}$ based on core data. In one embodiment, which will be detailed later, we derive an equation between the five stiffness parameters $c_{11}$, $c_{33}$, $c_{44}$, $c_{66}$ and $c_{13}$ as:

$$\frac{1}{f_{gain} c_{44}} = \frac{(c_{33} c_{11}) - (c_{13} - 2c_{66})^2 + 4 c_{11} c_{66}}{4 c_{66}((c_{11} - c_{66}) c_{33} - c_{13}^2)} \quad (19)$$

where $f_{gain}$ is a gain factor which will be detailed and verified later.

The details of the Derive a Correlation Step 32 will be explained later. At this stage, the five equations (15) to (19) are enough to solve the five stiffness parameters $c_{11}$, $c_{33}$, $c_{44}$, $c_{66}$ and $c_{13}$. Thus, in the following Compute Stiffness Parameters Step 34, the five stiffness parameters $c_{11}$, $c_{33}$, $c_{44}$, $c_{66}$ and $c_{13}$ are computed based on the borehole measurements by applying the five equations (15) to (19). Further, in the Calculate Elastic Moduli Step 36, the elastic moduli E, E', $\upsilon$, $\upsilon'$ and G' are computed by applying the equations (10) to (14).

Now we turn to details of the Derive a Correlation Step 32. We start with examining the variation of these elastic moduli along any specific direction inclined to the TI symmetric axis, which is corresponding to the case of wellbore penetration in TI formation, as shown in FIG. 4.

Since both stress and strain are second order tensors and they transform as second order tensors, the compliance tensor a (and also the stiffness tensor c) must transform as the fourth order tensor. The transformation equation is:

$$a'_{ijkl} = b_{ip} b_{jq} b_{kr} b_{ls} a_{pqrs} \quad (20)$$

where $a_{pqrs}$ and $a'_{ijkl}$ are the fourth order compliance tensors before and after the coordination system transformation; and $b_{ip}$ is the transformation tensor.

By rotating the coordinate space along $X_1$ axis with an angle of $\theta$ to the borehole coordinate system, we get the new coordinate system $X'_1 X'_2 X'_3$ where $X'_3$ is the borehole axis, as shown in FIG. 4. The transformation tensor is given by:

$$[b] = \begin{bmatrix} b_{11} & b_{12} & b_{13} \\ b_{21} & b_{22} & b_{23} \\ b_{31} & b_{32} & b_{33} \end{bmatrix} = \begin{bmatrix} 1 & 0 & 0 \\ 0 & \cos\theta & \sin\theta \\ 0 & -\sin\theta & \cos\theta \end{bmatrix} \quad (21)$$

Combing equations (20) and (21) and compacting the indices as described previously (equations (2) and (6)), we can get the transformation equation, as given by Lekhniskii [1963]:

$$a'_{ij} = q_{mi} q_{nj} a_{mn} \quad (i,j,m,n=1,2,3,4,5,6) \quad (22)$$

where $q_{ij}$ takes the form:

$$[q] = \begin{bmatrix} 1 & 0 & 0 & 0 & 0 & 0 \\ 0 & \cos^2\theta & \sin^2\theta & -\cos\theta\sin\theta & 0 & 0 \\ 0 & \sin^2\theta & \cos^2\theta & \cos\theta\sin\theta & 0 & 0 \\ 0 & \sin 2\theta & -\sin 2\theta & \cos 2\theta & 0 & 0 \\ 0 & 0 & 0 & 0 & \cos\theta & \sin\theta \\ 0 & 0 & 0 & 0 & -\sin\theta & \cos\theta \end{bmatrix} \quad (23)$$

This gives the TI formation elastic compliance tensor in $X'_1 X'_2 X'_3$ coordinate system (borehole coordinate system) as:

$$[a'] = \begin{bmatrix} a'_{11} & a'_{12} & a'_{13} & a'_{14} & 0 & 0 \\ a'_{12} & a'_{22} & a'_{23} & a'_{24} & 0 & 0 \\ a'_{13} & a'_{23} & a'_{33} & a'_{34} & 0 & 0 \\ a'_{14} & a'_{24} & a'_{34} & a'_{44} & 0 & 0 \\ 0 & 0 & 0 & 0 & a'_{55} & a'_{56} \\ 0 & 0 & 0 & 0 & a'_{56} & a'_{66} \end{bmatrix} \quad (24)$$

with:

$$a'_{11} = a_{11} \quad (25)$$

$$a'_{12} = \cos^2\theta \cdot a_{12} + \sin^2\theta \cdot a_{13} \quad (26)$$

$$a'_{13} = \sin^2\theta \cdot a_{12} + \cos^2\theta \cdot a_{13} \quad (27)$$

$$a'_{14} = 0.5 \sin 2\theta (-a_{12} + a_{13}) \quad (28)$$

$$a'_{22} = \cos^4\theta \cdot a_{11} + 0.5 \sin^2 2\theta \cdot a_{13} + \sin^4\theta \cdot a_{33} + \sin^2 2\theta \cdot a_{44} \quad (29)$$

$$a'_{23} = 0.25 \sin^2 2\theta (a_{11} + a_{33}) + (\sin^4\theta + \cos^4\theta) \cdot a_{13} - \sin^2 2\theta \cdot a_{44} \quad (30)$$

$$a'_{24} = -\sin\theta \cos^3\theta \cdot a_{11} + 0.25 \sin 4\theta \cdot a_{13} + \sin^3\theta \cos\theta \cdot a_{33} + 0.5 \sin 4\theta \cdot a_{44} \quad (31)$$

$$a'_{33} = \sin^4\theta \cdot a_{11} + 0.5 \sin^2 2\theta \cdot a_{13} + \cos^4\theta \cdot a_{33} + \sin^2 2\theta \cdot a_{44} \quad (32)$$

$$a'_{34} = -\sin^3\theta \cos\theta \cdot a_{11} - 0.25 \sin 4\theta \cdot a_{13} + \sin\theta \cos^3\theta \cdot a_{33} - 0.5 \sin 4\theta \cdot a_{44} \quad (33)$$

$$a'_{44} = \cos^2 2\theta \cdot a_{44} + \sin^2 2\theta \cdot (a_{11} + a_{33} - 2 a_{13}) \quad (34)$$

$$a'_{55} = \cos^2\theta \cdot a_{44} + \sin^2\theta \cdot a_{66} \quad (35)$$

$$a'_{56} = 0.5 \cos 2\theta \cdot (a_{44} - a_{66}) \quad (36)$$

$$a'_{66} = \sin^2\theta \cdot a_{44} + \cos^2\theta \cdot a_{66} \quad (37)$$

The non-zero $a'_{14}$, $a'_{24}$ and $a'_{34}$ illustrate that normal stress can induce not only normal strains, but also shear strains, and versa visa. The non-zero $a'_{56}$ represents that applying a shear stress in one direction can also induce shear strain in another direction. This kind of complexity can explain clearly the complexity of seismic/sonic waves transmitting in layered rock formation. Parameter $a'_{44}$ represents the shear compliance in the plane of $X'_2 X'_3$ along the $X'_3$ axis (borehole axis). By comparing with other components of $a'_{ij}$, we find that variation of $a'_{44}$ versus $\theta$ is relatively small. Specifically, in one embodiment, it takes the value between $a_{44}$ (where $\theta=0$ or $\theta=90$ in equation 34) and $(a_{11} + a_{33} - 2 a_{13})$ (where $\theta=45$ in equation 34).

As an approximation, we propose the assumption:

$$a_{44} = f_{gain}(a_{11} + a_{33} - 2a_{13}) \quad (38)$$

where $f_{gain}$ is the gain factor which can be derived with published core and field test data. From equation (34), equation (38) assumes the Shear Modulus G' (parallel to TI symmetric axis) is proportional to the shear module in the direction that inclined to TI symmetric axis with an angle of about 45 degree in the plane perpendicular to formation isotropy plane.

From Equations (7), (10), (11) and (12), Equation (38) can be rewritten as:

$$\frac{1}{f_{gain}G'} = \frac{1}{E} + \frac{1+2v'}{E'} \quad (39)$$

or equation (19) as we stated before:

$$\frac{1}{f_{gain}c_{44}} = \frac{(c_{33}c_{11}) - (c_{13} - 2c_{66})^2 + 4c_{11}c_{66}}{4c_{66}((c_{11} - c_{66})c_{33} - c_{13}^2)} \quad (19)$$

Thus, with the derived equation (19) together with equations (15)-(18), we can solve the five stiffness parameters $c_{11}$, $c_{33}$, $c_{44}$, $c_{66}$ and $c_{13}$, based on the borehole measurements $V_P$, $V_T$, $V_{SH}$, $V_{SV}$, $\theta$, $\rho$, $V_f$ and $\rho_f$, with the assumption that shear module parallel to symmetric axis has a correlation with other moduli. Therefore, the invention proposes a method to evaluate the TI formation elastic properties directly from sonic measurement. The model is based on mechanical deformation analysis and it assumes that the shear modulus parallel to TI symmetric axis can be approximated from other moduli.

The following part checks the accuracy of the assumption and further derives the value of the gain factor $f_{gain}$ from the statistical analysis of a variety of published core data and field measurements. Here we define $G'_{45}$ as the shear modulus in the plane that inclined to TI symmetric axis with the angle of about 45 degree. From equation (34), we will have:

$$\frac{1}{G'_{45}} = \frac{1}{E} + \frac{1+2v'}{E'} \quad (40)$$

Comparing with equation (39) with equation (40), we understand that the gain factor $f_{gain}$ can be calculated from:

$$G'_{45} = f_{gain} G' \quad (41)$$

Three groups of data have been collected and used for check: core data published by Zhijing Wang, in the article "Seismic anisotropy in sedimentary rocks" (Geophysics, Vol. 67, NO. 5, 2002); field and core data published by Leon Thomsen, in the article "Weak Elastic Anisotropy" (Geophysics, Vol. 51, 1986); and core data published by Lev Vernik and Xingzhou Liu, in the article "Velocity anisotropy in shales: A petrophysical study" (Geophysics. Vol. 62, No. 2, 1997).

Table 1a shows measured formation rock TI stiffness tensor C, elastic moduli, and shear modulus $G'_{45}$, on sand and shale formation published by Zhijing Wang, where Lith=1 and 2 represents the sand formation and shale formation respectively.

TABLE 1a

| Lith | G Density/ cc | C33 GPa | C44 GPa | C11 GPa | C66 GPa | C13 GPa | E GPa | v | E' GPa | v' | G' GPa | G45' GPa |
|---|---|---|---|---|---|---|---|---|---|---|---|---|
| 2 | 2.408 | 24.64 | 6.19 | 30.62 | 7.89 | 13.37 | 20.903 | 0.3246 | 16.7756 | 0.2941 | 6.19 | 7.016852 |
| 2 | 2.408 | 27.2 | 6.85 | 32.22 | 8.66 | 14.45 | 22.417 | 0.2943 | 18.3374 | 0.30666 | 6.85 | 7.542153 |
| 2 | 2.408 | 28.53 | 7.37 | 33.17 | 9.06 | 14.64 | 23.443 | 0.2938 | 19.6403 | 0.30361 | 7.37 | 8.032859 |
| 2 | 2.511 | 24.41 | 5.89 | 39.9 | 11.93 | 11.25 | 31.321 | 0.3127 | 19.8851 | 0.20111 | 5.89 | 9.761457 |
| 2 | 2.511 | 26.28 | 6.21 | 41.84 | 12.76 | 12.78 | 32.759 | 0.2837 | 20.6635 | 0.21974 | 6.21 | 9.98113 |
| 2 | 2.511 | 27.58 | 6.59 | 43.25 | 13.31 | 13.45 | 33.927 | 0.2745 | 21.5378 | 0.22462 | 6.59 | 10.33452 |
| 2 | 2.499 | 26.8 | 6.85 | 38.87 | 12.55 | 17 | 27.769 | 0.1063 | 15.8198 | 0.32295 | 6.85 | 7.140199 |
| 2 | 2.499 | 28.54 | 7.21 | 40.39 | 13.21 | 18.67 | 28.067 | 0.0623 | 15.7155 | 0.34345 | 7.21 | 6.994542 |
| 2 | 2.499 | 29.68 | 7.83 | 41.42 | 13.63 | 18.74 | 29.404 | 0.0787 | 17.0428 | 0.33717 | 7.83 | 7.561329 |
| 2 | 2.574 | 35.95 | 10.8 | 49.22 | 15.96 | 13.25 | 40.859 | 0.2801 | 30.6715 | 0.19919 | 10.8 | 14.2722 |
| 2 | 2.574 | 38.22 | 11.69 | 51.54 | 17.22 | 14.14 | 43.267 | 0.2563 | 32.3943 | 0.206 | 11.69 | 14.99239 |
| 2 | 2.574 | 39.39 | 12.12 | 52.52 | 17.65 | 14.87 | 44.035 | 0.2474 | 33.0488 | 0.21322 | 12.12 | 15.18117 |
| 2 | 2.535 | 26.33 | 6.54 | 43.5 | 13.76 | 18.57 | 30.13 | 0.0948 | 14.7347 | 0.31221 | 6.54 | 6.971843 |
| 2 | 2.535 | 28.02 | 7.05 | 45.2 | 14.44 | 19.69 | 31.167 | 0.0792 | 15.4161 | 0.32006 | 7.05 | 7.221509 |
| 2 | 2.535 | 28.86 | 7.32 | 46.09 | 14.77 | 20.34 | 31.6 | 0.0697 | 15.6507 | 0.32471 | 7.32 | 7.297393 |
| 2 | 2.319 | 12.17 | 4.17 | 16.91 | 5.43 | 3.66 | 14.26 | 0.3131 | 11.0031 | 0.15941 | 4.17 | 5.263572 |
| 2 | 2.319 | 12.89 | 4.39 | 17.77 | 5.69 | 3.77 | 14.99 | 0.3172 | 11.7134 | 0.15604 | 4.39 | 5.595146 |
| 2 | 2.319 | 13.46 | 4.56 | 18.42 | 5.89 | 4.22 | 15.443 | 0.311 | 12.0387 | 0.1684 | 4.56 | 5.6885 |
| 2 | 2.319 | 13.91 | 4.68 | 18.9 | 6.03 | 4.55 | 15.767 | 0.3074 | 12.3014 | 0.17677 | 4.68 | 5.765172 |
| 2 | 2.354 | 13.59 | 4.93 | 20.28 | 6.75 | 4.01 | 17.457 | 0.2931 | 12.4015 | 0.14819 | 4.93 | 6.179742 |
| 2 | 2.354 | 13.4 | 5.09 | 21.66 | 7.01 | 4.57 | 18.262 | 0.3025 | 11.9744 | 0.15597 | 5.09 | 6.085604 |
| 2 | 2.354 | 14.82 | 5.21 | 22.29 | 7.14 | 4.91 | 18.691 | 0.3089 | 13.2287 | 0.16205 | 5.21 | 6.510713 |
| 2 | 2.354 | 15.07 | 5.26 | 22.59 | 7.28 | 5.1 | 18.959 | 0.3021 | 13.3711 | 0.16656 | 5.26 | 6.559709 |
| 2 | 2.439 | 23.41 | 4.43 | 27.94 | 5.78 | 16.49 | 14.934 | 0.2919 | 11.1392 | 0.37207 | 4.43 | 4.473524 |
| 2 | 2.439 | 25.21 | 5.22 | 30.51 | 6.62 | 17.21 | 17.136 | 0.2943 | 12.8122 | 0.36019 | 5.22 | 5.19123 |
| 2 | 2.439 | 26.36 | 5.66 | 31.64 | 7.06 | 17.52 | 18.269 | 0.2938 | 13.8722 | 0.35639 | 5.66 | 5.611492 |
| 2 | 2.439 | 27.43 | 6.08 | 32.73 | 7.46 | 17.75 | 19.361 | 0.2977 | 14.9622 | 0.35121 | 6.08 | 6.044836 |
| 2 | 2.44 | 18.33 | 4.64 | 26.33 | 5.77 | 12.22 | 15.756 | 0.3654 | 11.0669 | 0.29718 | 4.64 | 4.818533 |
| 2 | 2.44 | 19.31 | 4.75 | 27.36 | 5.92 | 13.21 | 16.029 | 0.3538 | 11.1708 | 0.30807 | 4.75 | 4.829492 |
| 2 | 2.44 | 20.07 | 4.85 | 28.56 | 6.28 | 13.87 | 16.806 | 0.3381 | 11.4355 | 0.31127 | 4.85 | 4.965544 |
| 2 | 2.44 | 21.11 | 4.95 | 29.67 | 6.68 | 15 | 17.332 | 0.2973 | 11.3231 | 0.32623 | 4.95 | 4.910753 |
| 2 | 2.44 | 22.02 | 5.02 | 30.92 | 7.03 | 15.89 | 17.958 | 0.2773 | 11.4511 | 0.33257 | 5.02 | 4.9727 |
| 2 | 2.605 | 36.18 | 14.73 | 54.42 | 20.23 | 7.94 | 49.844 | 0.2319 | 34.3361 | 0.11612 | 14.73 | 17.8731 |
| 2 | 2.605 | 37.4 | 14.95 | 55.32 | 20.36 | 8.35 | 50.421 | 0.2382 | 35.4056 | 0.11942 | 14.95 | 18.24057 |
| 2 | 2.605 | 38.4 | 15.12 | 56.09 | 20.48 | 8.71 | 50.917 | 0.2431 | 36.2696 | 0.1223 | 15.12 | 18.53396 |

TABLE 1a-continued

| Lith | G Density/cc | C33 GPa | C44 GPa | C11 GPa | C66 GPa | C13 GPa | E GPa | $\upsilon$ | E' GPa | $\upsilon'$ | G' GPa | G45' GPa |
|---|---|---|---|---|---|---|---|---|---|---|---|---|
| 2 | 2.605 | 39.67 | 15.34 | 56.98 | 20.63 | 9.3 | 51.454 | 0.2471 | 37.2906 | 0.12792 | 15.34 | 18.82816 |
| 2 | 2.627 | 39.01 | 17.48 | 52.52 | 19.22 | 5.04 | 48.392 | 0.2589 | 38.2472 | 0.07568 | 17.48 | 19.69767 |
| 2 | 2.627 | 41.32 | 18.14 | 53.76 | 19.44 | 5.66 | 49.23 | 0.2662 | 40.3866 | 0.08246 | 18.14 | 20.34297 |
| 2 | 2.627 | 43.46 | 18.53 | 54.88 | 19.58 | 6.6 | 49.857 | 0.2732 | 42.226 | 0.09348 | 18.53 | 20.76104 |
| 2 | 2.627 | 46.82 | 18.71 | 56 | 19.65 | 9.03 | 50.135 | 0.2757 | 44.5768 | 0.12421 | 18.71 | 20.85404 |
| 2 | 2.626 | 36.51 | 16.36 | 54.93 | 20.82 | 7.97 | 50.682 | 0.2171 | 34.6478 | 0.11683 | 16.36 | 18.07126 |
| 2 | 2.626 | 37.42 | 16.53 | 55.73 | 20.91 | 8.39 | 51.162 | 0.2234 | 35.3984 | 0.12048 | 16.53 | 18.31415 |
| 2 | 2.626 | 38.3 | 16.69 | 56.54 | 21.01 | 8.57 | 51.715 | 0.2307 | 36.2329 | 0.1206 | 16.69 | 18.6591 |
| 2 | 2.626 | 39.34 | 16.88 | 57.39 | 21.12 | 8.96 | 52.244 | 0.2368 | 37.1266 | 0.12352 | 16.88 | 18.96468 |
| 2 | 2.56 | 32.98 | 12.97 | 52.59 | 17.7 | 10.55 | 45.337 | 0.2807 | 29.7899 | 0.15119 | 12.97 | 15.20316 |
| 2 | 2.56 | 35.11 | 13.13 | 53.71 | 17.84 | 12.11 | 45.659 | 0.2797 | 31.0216 | 0.1688 | 13.13 | 15.37982 |
| 2 | 2.56 | 36.83 | 13.27 | 54.53 | 17.96 | 13.56 | 45.794 | 0.2749 | 31.802 | 0.1854 | 13.27 | 15.39861 |
| 2 | 2.56 | 38.53 | 13.41 | 55.27 | 18.09 | 15.5 | 45.665 | 0.2622 | 32.0682 | 0.20845 | 13.41 | 15.13262 |
| 2 | 2.597 | 45.23 | 18.08 | 58.37 | 20.63 | 5.81 | 52.977 | 0.284 | 44.3356 | 0.07697 | 18.08 | 22.26984 |
| 2 | 2.597 | 47.26 | 18.38 | 59.62 | 20.96 | 7.37 | 53.786 | 0.2831 | 45.855 | 0.09532 | 18.38 | 22.44292 |
| 2 | 2.597 | 48.78 | 18.59 | 60.58 | 21.16 | 8.7 | 54.299 | 0.2831 | 46.8599 | 0.11035 | 18.59 | 22.48881 |
| 2 | 2.597 | 50.48 | 18.76 | 61.63 | 21.31 | 10.71 | 54.638 | 0.282 | 47.6352 | 0.13281 | 18.76 | 22.2859 |
| 2 | 1.841 | 13.54 | 4.04 | 15.19 | 4.4 | 5.71 | 11.541 | 0.3115 | 10.5183 | 0.2646 | 4.04 | 4.309825 |
| 2 | 1.841 | 13.68 | 4.08 | 15.29 | 4.47 | 5.81 | 11.647 | 0.3028 | 10.5602 | 0.26848 | 4.08 | 4.321463 |
| 2 | 1.841 | 13.81 | 4.12 | 15.37 | 4.52 | 5.91 | 11.716 | 0.296 | 10.5908 | 0.27235 | 4.12 | 4.325116 |
| 2 | 1.841 | 13.9 | 4.15 | 15.45 | 4.56 | 6 | 11.772 | 0.2908 | 10.5942 | 0.27548 | 4.15 | 4.322604 |
| 2 | 1.949 | 17.46 | 5.22 | 18.24 | 5.34 | 3.56 | 14.847 | 0.3902 | 16.4776 | 0.13798 | 5.22 | 6.90662 |
| 2 | 1.949 | 17.75 | 5.32 | 18.4 | 5.42 | 3.73 | 15.01 | 0.3847 | 16.6781 | 0.14368 | 5.32 | 6.953497 |
| 2 | 1.949 | 17.98 | 5.38 | 18.52 | 5.48 | 3.9 | 15.124 | 0.3799 | 16.8136 | 0.14954 | 5.38 | 6.974186 |
| 2 | 1.949 | 18.2 | 5.44 | 18.61 | 5.53 | 4.01 | 15.219 | 0.3761 | 16.9706 | 0.15329 | 5.44 | 7.007904 |
| 2 | 1.783 | 12.79 | 3.82 | 23.43 | 6.76 | 4.93 | 18.55 | 0.372 | 11.332 | 0.14787 | 3.82 | 5.943453 |
| 2 | 1.783 | 13.29 | 3.89 | 23.95 | 6.85 | 5.16 | 18.848 | 0.3758 | 11.7329 | 0.15088 | 3.89 | 6.097374 |
| 2 | 1.783 | 13.58 | 3.92 | 24.27 | 6.88 | 5.39 | 18.965 | 0.3782 | 11.9094 | 0.15497 | 3.92 | 6.145416 |
| 2 | 1.783 | 13.91 | 3.98 | 24.64 | 6.95 | 5.44 | 19.218 | 0.3826 | 12.2371 | 0.15376 | 3.98 | 6.293892 |
| 2 | 1.725 | 10.91 | 3.71 | 22.08 | 6.86 | 1.25 | 18.859 | 0.3746 | 10.8073 | 0.04106 | 3.71 | 6.529376 |
| 2 | 1.725 | 11.75 | 3.82 | 22.63 | 6.96 | 2.58 | 19.058 | 0.3691 | 11.3252 | 0.08232 | 3.82 | 6.438796 |
| 2 | 1.725 | 12.23 | 3.89 | 23 | 6.98 | 3.2 | 19.127 | 0.3701 | 11.5908 | 0.09988 | 3.89 | 6.418833 |
| 2 | 1.725 | 12.63 | 3.94 | 23.43 | 6.98 | 3.54 | 19.235 | 0.3778 | 11.8682 | 0.1076 | 3.94 | 6.477492 |
| 1 | 2.337 | 24.38 | 6.54 | 24.27 | 6.41 | 11.24 | 17.03 | 0.3284 | 17.3062 | 0.31468 | 6.54 | 6.541576 |
| 1 | 2.337 | 26.8 | 6.75 | 26.4 | 6.65 | 13.53 | 17.561 | 0.3204 | 17.5311 | 0.34253 | 6.75 | 6.533244 |
| 1 | 2.337 | 27.3 | 7.04 | 27.16 | 6.91 | 13.66 | 18.243 | 0.32 | 18.0854 | 0.33728 | 7.04 | 6.783913 |
| 1 | 2.307 | 28.73 | 7.49 | 28.45 | 6.99 | 13.91 | 18.96 | 0.3562 | 19.7138 | 0.32409 | 7.49 | 7.334143 |
| 1 | 2.307 | 32.46 | 9.32 | 33 | 8.86 | 14.74 | 23.504 | 0.3264 | 23.4597 | 0.3053 | 9.32 | 8.992782 |
| 1 | 2.307 | 34.11 | 10.11 | 34.28 | 9.56 | 14.62 | 25.19 | 0.3175 | 25.4634 | 0.29571 | 10.11 | 9.785062 |
| 1 | 2.281 | 31.78 | 10.19 | 32.34 | 10.41 | 8.91 | 27.114 | 0.3023 | 28.1599 | 0.20315 | 10.19 | 11.51805 |
| 1 | 2.281 | 35.65 | 11.81 | 35.78 | 12.01 | 9.9 | 30.573 | 0.2728 | 31.5267 | 0.20825 | 11.81 | 12.88015 |
| 1 | 2.281 | 37.19 | 12.63 | 36.65 | 12.5 | 9.82 | 31.648 | 0.2659 | 33.1969 | 0.20331 | 12.63 | 13.51913 |
| 1 | 2.639 | 66.06 | 20.49 | 70.82 | 22.87 | 24.01 | 57.786 | 0.2634 | 54.0375 | 0.25036 | 20.49 | 22.1842 |
| 1 | 2.639 | 67.93 | 21.15 | 72 | 23.42 | 24.28 | 59.032 | 0.2603 | 55.795 | 0.2499 | 21.15 | 22.82038 |
| 1 | 2.639 | 69.41 | 21.59 | 72.76 | 23.82 | 24.85 | 59.742 | 0.254 | 56.792 | 0.25388 | 21.59 | 23.10136 |
| 1 | 2.639 | 70.41 | 21.91 | 73.72 | 24.1 | 24.95 | 60.591 | 0.2571 | 57.8646 | 0.25141 | 21.91 | 23.54303 |
| 1 | 2.639 | 65.96 | 23.99 | 78.21 | 25.86 | 24.61 | 64.688 | 0.2507 | 54.3907 | 0.23505 | 23.99 | 23.5364 |
| 1 | 2.639 | 68.66 | 24.37 | 79.1 | 26.02 | 25.64 | 65.128 | 0.2515 | 56.2747 | 0.24152 | 24.37 | 23.97617 |
| 1 | 2.639 | 69.87 | 24.6 | 79.48 | 26.16 | 25.89 | 65.471 | 0.2514 | 57.2989 | 0.24278 | 24.6 | 24.2716 |
| 1 | 2.639 | 71.24 | 24.9 | 79.97 | 26.39 | 25.91 | 66.072 | 0.2518 | 58.7105 | 0.24179 | 24.9 | 24.74985 |
| 1 | 2.622 | 57.05 | 24.79 | 69.64 | 26.83 | 11.27 | 64.608 | 0.204 | 54.0831 | 0.13163 | 24.79 | 25.74948 |
| 1 | 2.622 | 59.01 | 25.17 | 71.01 | 26.86 | 11.64 | 65.442 | 0.2182 | 55.9412 | 0.13182 | 25.17 | 26.40646 |
| 1 | 2.622 | 60.43 | 25.48 | 71.82 | 27.01 | 12.35 | 65.929 | 0.2204 | 57.0262 | 0.1378 | 25.48 | 26.64057 |
| 1 | 2.622 | 61.82 | 25.75 | 72.32 | 27.12 | 13.71 | 66.015 | 0.2171 | 57.6615 | 0.15166 | 25.75 | 26.48931 |
| 1 | 2.751 | 53 | 18.53 | 59 | 19.89 | 16.1 | 50.315 | 0.2648 | 46.3723 | 0.20583 | 18.53 | 19.87406 |
| 1 | 2.751 | 54.97 | 19.39 | 60.23 | 20.64 | 16.67 | 51.676 | 0.2518 | 47.9508 | 0.21053 | 19.39 | 20.41342 |
| 1 | 2.751 | 56.23 | 19.95 | 61 | 21.14 | 16.68 | 52.668 | 0.2457 | 49.25 | 0.20923 | 19.95 | 20.92572 |
| 1 | 2.751 | 57.24 | 20.38 | 61.58 | 21.55 | 17.15 | 53.288 | 0.2364 | 49.8924 | 0.21421 | 20.38 | 21.09877 |
| 1 | 2.698 | 54.92 | 18.3 | 57.92 | 18.87 | 17.1 | 48.4 | 0.2825 | 47.4319 | 0.23181 | 18.3 | 19.61695 |
| 1 | 2.698 | 57.08 | 19.14 | 59.17 | 19.72 | 18.29 | 49.701 | 0.2602 | 48.6003 | 0.23181 | 19.14 | 19.9061 |
| 1 | 2.698 | 58.38 | 19.66 | 60 | 20.24 | 18.5 | 50.692 | 0.2523 | 49.7721 | 0.23265 | 19.66 | 20.33886 |
| 1 | 2.698 | 59.37 | 20.03 | 60.68 | 20.63 | 18.75 | 51.431 | 0.2465 | 50.5919 | 0.23408 | 20.03 | 20.63417 |
| 1 | 2.074 | 16.13 | 7.04 | 17.42 | 6.67 | 2.63 | 16.207 | 0.2149 | 15.4866 | 0.12233 | 7.04 | 7.038634 |
| 1 | 2.074 | 22.73 | 8.9 | 22.77 | 8.77 | 4.88 | 20.917 | 0.1925 | 21.029 | 0.17429 | 8.9 | 8.933589 |
| 1 | 2.074 | 25.74 | 10.02 | 25.72 | 9.85 | 5.89 | 23.477 | 0.1917 | 23.554 | 0.18557 | 10.02 | 9.919808 |
| 1 | 2.049 | 21.77 | 9.84 | 23.75 | 10.38 | 3.32 | 22.978 | 0.1069 | 20.9456 | 0.12416 | 9.84 | 9.697682 |
| 1 | 2.049 | 27.38 | 11.65 | 28.7 | 11.92 | 4.93 | 27.245 | 0.1428 | 25.9316 | 0.1469 | 11.65 | 11.54774 |
| 1 | 2.049 | 30.26 | 12.45 | 30.95 | 12.53 | 5.72 | 29.095 | 0.161 | 28.4838 | 0.15527 | 12.45 | 12.44083 |
| 1 | 2.598 | 43.42 | 18.79 | 52.11 | 21.27 | 7.72 | 49.413 | 0.1616 | 41.4875 | 0.12516 | 18.79 | 19.85113 |
| 1 | 2.598 | 48.92 | 20 | 56.94 | 22.65 | 10.72 | 53.01 | 0.1702 | 45.5686 | 0.15631 | 20 | 20.97756 |
| 1 | 2.598 | 51.6 | 20.55 | 59 | 23.22 | 11.55 | 54.651 | 0.1768 | 47.8716 | 0.1614 | 20.55 | 21.77213 |
| 1 | 2.598 | 54.15 | 21.05 | 60.93 | 23.7 | 12.87 | 55.977 | 0.1809 | 49.701 | 0.17284 | 21.05 | 22.25172 |
| 1 | 2.616 | 49.82 | 23.29 | 65.15 | 25.45 | 10.28 | 60.695 | 0.1924 | 47.1581 | 0.12947 | 23.29 | 23.16312 |
| 1 | 2.616 | 54.1 | 23.91 | 67.14 | 25.92 | 12.61 | 61.821 | 0.1925 | 50.2424 | 0.15296 | 23.91 | 23.71458 |
| 1 | 2.616 | 56.91 | 24.39 | 68.48 | 26.18 | 14.18 | 62.507 | 0.1938 | 52.1565 | 0.16761 | 24.39 | 24.03937 |
| 1 | 2.616 | 59.37 | 24.86 | 69.61 | 26.44 | 15.58 | 63.082 | 0.1929 | 53.7472 | 0.18045 | 24.86 | 24.28798 |

TABLE 1a-continued

| Lith | G Density/cc | C33 GPa | C44 GPa | C11 GPa | C66 GPa | C13 GPa | E GPa | υ | E' GPa | υ' | G' GPa | G45' GPa |
|---|---|---|---|---|---|---|---|---|---|---|---|---|
| 1 | 2.6 | 52.61 | 24.04 | 65.67 | 26.5 | 10.98 | 61.679 | 0.1638 | 49.5321 | 0.14016 | 24.04 | 23.77488 |
| 1 | 2.6 | 56.27 | 24.77 | 67.97 | 26.85 | 12.06 | 63.297 | 0.1787 | 52.7329 | 0.14664 | 24.77 | 24.79926 |
| 1 | 2.6 | 58.68 | 24.99 | 69.47 | 27.12 | 14.82 | 63.72 | 0.1748 | 53.4939 | 0.17497 | 24.99 | 24.43243 |
| 1 | 2.6 | 60.69 | 25.7 | 70.56 | 27.34 | 14.64 | 64.754 | 0.1842 | 55.731 | 0.16937 | 25.7 | 25.33922 |
| 1 | 2.504 | 33.89 | 17.15 | 47.31 | 19.74 | 5.29 | 45.429 | 0.1507 | 32.875 | 0.09594 | 17.15 | 17.16231 |
| 1 | 2.504 | 39.94 | 18.92 | 52.3 | 21.14 | 8.23 | 49.235 | 0.1645 | 37.7663 | 0.13206 | 18.92 | 18.59323 |
| 1 | 2.504 | 44.03 | 20.11 | 54.36 | 21.96 | 9.02 | 51.106 | 0.1636 | 41.5189 | 0.1392 | 20.11 | 19.85791 |
| 1 | 2.504 | 46.9 | 21.13 | 54.95 | 22.62 | 8.02 | 52.281 | 0.1556 | 44.9105 | 0.12403 | 21.13 | 21.31398 |
| 1 | 2.609 | 37.67 | 17.75 | 47.66 | 19.81 | 6.66 | 45.469 | 0.1476 | 36.0773 | 0.11957 | 17.75 | 17.74952 |
| 1 | 2.609 | 43.63 | 19.41 | 52.95 | 21.22 | 8.16 | 49.854 | 0.1747 | 41.5315 | 0.12858 | 19.41 | 19.86938 |
| 1 | 2.609 | 47.2 | 20.37 | 54.95 | 22.02 | 9.52 | 51.506 | 0.1695 | 44.4478 | 0.14455 | 20.37 | 20.65356 |
| 1 | 2.609 | 50.5 | 21.11 | 56.57 | 22.67 | 10.42 | 52.905 | 0.1668 | 47.2972 | 0.15369 | 21.11 | 21.48526 |

Table 1b shows measured formation rock TI stiffness tensor C, elastic moduli and shear modulus $G'_{45}$, on sand and shale at various condition based on test data from Leon Thomsen, where Lith=1 and 2 represents the sand formation and shale formation respectively.

Table 1c shows measured formation rock TI stiffness tensor C, elastic moduli, and shear modulus $G'_{45}$, on sand and shale at various condition based on test data from Lev Vernik and Xingzhou Liu, where Lith=1 and 2 represents the sand formation and shale formation respectively.

TABLE 1b

| Lith | Density G/cc | C33 GPa | C44 GPa | C11 GPa | C66 GPa | C13 GPa | E GPa | υ | E' GPa | υ' | G' GPa | G45' GPa |
|---|---|---|---|---|---|---|---|---|---|---|---|---|
| 1 | 2.6 | 77.5102 | 26.9411 | 77.5102 | 26.5639 | -4.8578 | 69.697 | 0.3119 | 77.047 | -0.04768 | 26.9411 | 38.32971 |
| 1 | 2.5 | 28.3586 | 8.3631 | 34.5974 | 12.6283 | 10.6139 | 29.684 | 0.1753 | 23.2307 | 0.24156 | 8.3631 | 10.25309 |
| 1 | 2.87 | 45.0517 | 24.5714 | 50.0073 | 26.5863 | -8.5963 | 47.89 | -0.099 | 41.8965 | -0.1835 | 24.5714 | 27.78611 |
| 1 | 2.51 | 48.7041 | 16.219 | 56.4968 | 19.2358 | 16.1196 | 48.014 | 0.248 | 41.7305 | 0.21631 | 16.219 | 18.12995 |
| 1 | 2.45 | 41.1644 | 13.4841 | 47.5037 | 15.264 | 14.6048 | 39.035 | 0.2787 | 34.5483 | 0.2265 | 13.4841 | 14.77649 |
| 1 | 2.69 | 48.2913 | 24.5014 | 51.7683 | 25.9715 | -2.6759 | 51.618 | -0.006 | 48.0138 | -0.0518 | 24.5014 | 26.28811 |
| 1 | 2.47 | 53.9141 | 19.8239 | 56.3942 | 20.3394 | 14.3739 | 49.875 | 0.2261 | 48.1837 | 0.19933 | 19.8239 | 20.37582 |
| 1 | 2.43 | 61.4567 | 21.6809 | 60.8422 | 21.8977 | 17.1622 | 53.37 | 0.2186 | 53.8936 | 0.22034 | 21.6809 | 21.99302 |
| 1 | 2.73 | 37.1317 | 21.0076 | 43.147 | 21.0076 | -2.8901 | 42.903 | 0.0211 | 36.7544 | -0.0653 | 21.0076 | 21.29275 |
| 1 | 2.5 | 50.0864 | 19.7965 | 59.8032 | 21.8157 | 14.752 | 52.936 | 0.2133 | 44.3577 | 0.19417 | 19.7965 | 19.92454 |
| 1 | 2.03 | 4.03012 | 1.23505 | 4.20745 | 1.24493 | 1.63164 | 3.2319 | 0.298 | 3.13147 | 0.27538 | 1.23505 | 1.242797 |
| 1 | 2.71 | 58.1693 | 28.2907 | 55.1445 | 30.271 | -0.3976 | 54.613 | -0.098 | 58.163 | -0.0080 | 28.2907 | 28.38576 |
| 1 | 2.5 | 59.2679 | 21.1848 | 63.1796 | 20.3798 | 19.1995 | 52.352 | 0.2844 | 50.6552 | 0.22429 | 21.1848 | 20.96508 |
| 1 | 2.16 | 31.3548 | 12.112 | 33.2361 | 12.8388 | 8.49342 | 30.042 | 0.17 | 27.8181 | 0.2082 | 12.112 | 11.876 |
| 1 | 2.14 | 37.8575 | 15.1874 | 38.009 | 15.3392 | 8.22773 | 35.373 | 0.153 | 34.8714 | 0.18147 | 15.1874 | 14.84668 |
| 1 | 2.46 | 46.528 | 16.2607 | 54.996 | 19.6754 | 20.249 | 45.173 | 0.1479 | 34.9194 | 0.28665 | 16.2607 | 14.8827 |
| 1 | 2.48 | 51.0943 | 18.1596 | 57.2256 | 19.794 | 21.4126 | 46.696 | 0.1796 | 38.8453 | 0.28602 | 18.1596 | 16.15916 |
| 1 | 2.45 | 47.8209 | 16.3968 | 52.8899 | 20.7583 | 21.8437 | 42.867 | 0.0325 | 32.9711 | 0.33991 | 16.3968 | 13.46322 |
| 2 | 2.075 | 22.4873 | 6.48608 | 31.2574 | 8.82108 | 3.39909 | 25.16 | 0.4262 | 21.9724 | 0.07575 | 6.48608 | 10.85167 |
| 2 | 2.42 | 27.598 | 5.37264 | 38.6372 | 10.8527 | 14.6763 | 28.131 | 0.296 | 19.8457 | 0.26411 | 5.37264 | 8.884666 |
| 2 | 2.42 | 22.4825 | 5.37264 | 33.9486 | 10.5304 | 10.5736 | 26.814 | 0.2732 | 17.7085 | 0.22575 | 5.37264 | 8.38496 |
| 2 | 2 | 7.03125 | 1.36455 | 10.1953 | 2.30609 | 4.96635 | 6.0435 | 0.3103 | 3.90488 | 0.31476 | 1.36455 | 1.715946 |
| 2 | 2.44 | 26.6683 | 8.07338 | 35.6822 | 12.4491 | 10.5216 | 30.136 | 0.2104 | 21.9034 | 0.22644 | 8.07338 | 10.04885 |
| 2 | 2.44 | 26.6683 | 8.07338 | 33.8154 | 10.5923 | 10.5216 | 27.24 | 0.2859 | 21.9014 | 0.22653 | 8.07338 | 9.703456 |
| 2 | 2.81 | 53.3925 | 26.1058 | 71.7595 | 34.303 | 1.18097 | 71.597 | 0.0436 | 53.3552 | 0.01576 | 26.1058 | 30.02977 |
| 2 | 2.64 | 40.175 | 18.9898 | 51.1829 | 19.9773 | 1.70759 | 48.675 | 0.2183 | 40.0816 | 0.02736 | 18.9898 | 21.3408 |
| 2 | 2.34 | 17.632 | 5.32131 | 21.2641 | 8.99301 | 6.97169 | 18.493 | 0.0282 | 13.6711 | 0.28407 | 5.32131 | 5.924879 |
| 2 | 2.34 | 21.1865 | 6.40158 | 23.6866 | 8.48849 | 8.3622 | 19.816 | 0.1672 | 16.5855 | 0.27511 | 6.40158 | 6.94772 |
| 2 | 2.69 | 63.1712 | 27.0315 | 71.1308 | 28.5453 | 9.61 | 67.398 | 0.1805 | 61.0026 | 0.11283 | 27.0315 | 28.6293 |
| 2 | 2.92 | 41.0406 | 14.9274 | 51.547 | 17.9129 | 14.2117 | 44.124 | 0.2316 | 35.0356 | 0.21127 | 14.9274 | 15.8063 |
| 2 | 2.31 | 40.1106 | 13.6628 | 43.3194 | 14.4825 | 13.1831 | 36.411 | 0.257 | 34.0838 | 0.22858 | 13.6628 | 14.24157 |
| 2 | 2.25 | 9.67832 | 1.69911 | 11.8076 | 2.25982 | 7.10818 | 5.9381 | 0.3139 | 4.38637 | 0.37224 | 1.69911 | 1.766442 |
| 2 | 2.34 | 21.1865 | 6.40158 | 21.7374 | 6.84969 | 8.3622 | 17.22 | 0.257 | 16.4896 | 0.28084 | 6.40158 | 6.545334 |
| 2 | 2.25 | 9.97928 | 1.77023 | 13.8712 | 2.83237 | 8.03082 | 6.998 | 0.2354 | 4.1368 | 0.36375 | 1.77023 | 1.784145 |
| 2 | 2.35 | 26.895 | 13.968 | 30.3914 | 15.9515 | 0.45875 | 30.308 | -0.05 | 26.8804 | 0.01588 | 13.968 | 14.00978 |
| 2 | 2.68 | 68.9707 | 24.0879 | 70.3501 | 23.847 | 21.6151 | 59.608 | 0.2498 | 58.9237 | 0.23241 | 24.0879 | 24.01793 |
| 2 | 2.56 | 36.8498 | 11.0118 | 50.779 | 14.8659 | 21.4854 | 36.354 | 0.2227 | 23.9959 | 0.29913 | 11.0118 | 10.62553 |
| 2 | 2.31 | 44.8029 | 15.4001 | 47.0431 | 16.0161 | 16.3714 | 39.076 | 0.2199 | 36.1645 | 0.26383 | 15.4001 | 14.74206 |
| 2 | 2.66 | 49.0919 | 16.2415 | 57.0448 | 17.8007 | 22.4266 | 44.12 | 0.2393 | 36.276 | 0.28573 | 16.2415 | 15.15495 |
| 2 | 2.64 | 45.0302 | 14.954 | 52.6854 | 20.487 | 20.1119 | 43.532 | 0.0624 | 32.4678 | 0.31231 | 14.954 | 13.69686 |
| 2 | 2.64 | 58.8399 | 22.0495 | 74.7267 | 29.9874 | 25.2904 | 63.62 | 0.0608 | 44.5436 | 0.28264 | 22.0495 | 19.66231 |
| 2 | 2.25 | 10.9098 | 2.11266 | 11.2371 | 2.23942 | 7.31638 | 5.7889 | 0.2925 | 4.96057 | 0.40657 | 2.11266 | 1.857857 |
| 2 | 2.52 | 51.6898 | 18.4116 | 55.2047 | 20.1055 | 24.4059 | 43.406 | 0.0794 | 34.7195 | 0.34767 | 18.4116 | 13.91438 |
| 2 | 2.37 | 42.4262 | 72.7128 | 59.3967 | 93.7996 | -47.017 | -4451 | -24.72 | 106.682 | 0.68333 | 72.7128 | 45.5383 |
| 2 | 1.8 | 2.01486 | 0.26958 | 2.88124 | 0.42055 | 2.02418 | 0.8476 | 0.0078 | 0.34976 | 0.4113 | 0.26958 | 0.156474 |
| 2 | 2.59 | 39.9616 | 10.9376 | 66.6559 | 23.5159 | 39.4187 | 14.417 | -0.693 | 3.94319 | 0.45687 | 10.9376 | 1.802814 |

TABLE 1c

| Lith | Density G/cc | C33 GPa | C44 GPa | C11 GPa | C66 GPa | C13 GPa | E GPa | $\upsilon$ | E' GPa | $\upsilon'$ | G' GPa | G45' GPa |
|---|---|---|---|---|---|---|---|---|---|---|---|---|
| 2 | 2.21 | 25.6981 | 9.469629 | 38.24538 | 13.92322 | 9.594818 | 33.3225 | 0.196652 | 21.91305 | 0.197244 | 9.469629 | 10.67839 |
| 2 | 2.22 | 25.36217 | 9.977568 | 38.97454 | 14.66288 | 6.390109 | 35.63503 | 0.215144 | 23.68258 | 0.131421 | 9.977568 | 12.28714 |
| 2 | 2.33 | 27.89383 | 9.32 | 46.97303 | 15.99405 | 11.36532 | 39.8103 | 0.244535 | 23.72421 | 0.183436 | 9.32 | 12.0869 |
| 2 | 2.34 | 28.82903 | 9.642906 | 45.71518 | 17.69625 | 14.17368 | 38.45637 | 0.086568 | 21.65912 | 0.25293 | 9.642906 | 10.46803 |
| 2 | 2.35 | 25.43664 | 8.13006 | 51.25092 | 17.64286 | 15.61126 | 40.69172 | 0.153206 | 18.18506 | 0.232255 | 8.13006 | 9.513961 |
| 2 | 2.55 | 45.19646 | 16.19352 | 62.9873 | 21.59366 | 13.69968 | 54.67321 | 0.265955 | 40.6624 | 0.16548 | 16.19352 | 19.5992 |
| 2 | 2.38 | 32.93539 | 12.04875 | 45.24285 | 15.96528 | 9.803627 | 39.77208 | 0.245581 | 29.65264 | 0.167426 | 12.04875 | 14.25323 |
| 2 | 2.48 | 36.7598 | 14.2848 | 56.19085 | 19.30457 | 12.54674 | 48.50106 | 0.256207 | 32.49207 | 0.170073 | 14.2848 | 16.16463 |
| 2 | 2.44 | 27.21966 | 11.59586 | 48.3181 | 19.1296 | 7.461435 | 44.88498 | 0.173181 | 25.3123 | 0.127815 | 11.59586 | 13.91117 |
| 2 | 2.32 | 22.43927 | 9.003688 | 46.14851 | 17.545 | 3.740951 | 43.13305 | 0.229212 | 21.95001 | 0.065393 | 9.003688 | 13.38679 |
| 2 | 2.34 | 25.17466 | 10.3194 | 45.50855 | 17.82518 | 9.497451 | 40.9863 | 0.149674 | 21.91633 | 0.171537 | 10.3194 | 11.67129 |
| 2 | 2.5 | 27.225 | 13.225 | 58.564 | 23.56225 | 15.69441 | 49.40108 | 0.04831 | 20.1878 | 0.224195 | 13.225 | 10.87095 |
| 2 | 2.57 | 37.50247 | 16.84275 | 61.7057 | 24.38005 | 11.41894 | 56.66908 | 0.162612 | 34.0091 | 0.152964 | 16.84275 | 17.84458 |
| 2 | 2.43 | 28.25628 | 12.63211 | 55.75416 | 21.72444 | 6.999206 | 51.95163 | 0.195695 | 26.81669 | 0.10284 | 12.63211 | 15.57421 |
| 2 | 2.49 | 32.2704 | 15.3145 | 58.32974 | 23.62114 | 8.140698 | 54.82595 | 0.160527 | 30.36105 | 0.117272 | 15.3145 | 16.97746 |
| 2 | 2.46 | 33.49561 | 15.74621 | 56.20706 | 23.33654 | 8.266962 | 53.13002 | 0.138344 | 31.41646 | 0.12575 | 15.74621 | 17.04809 |
| 2 | 2.15 | 28.17446 | 11.07874 | 39.20074 | 12.80024 | 4.233491 | 34.2065 | 0.336167 | 27.49559 | 0.080178 | 11.07874 | 13.99859 |
| 2 | 1.56 | 10.38398 | 4.455516 | 13.1196 | 4.942704 | 1.472952 | 12.20178 | 0.234322 | 10.11865 | 0.090068 | 4.455516 | 5.035627 |
| 2 | 1.44 | 8.2944 | 3.283344 | 10.26562 | 3.779136 | 2.639997 | 9.055492 | 0.19809 | 7.219921 | 0.2035 | 3.283344 | 3.275384 |
| 2 | 1.56 | 11.20454 | 4.998396 | 16.1747 | 6.5559 | 1.744747 | 15.41312 | 0.175515 | 10.88807 | 0.090695 | 4.998396 | 5.76758 |
| 2 | 2.23 | 43.96133 | 15.77859 | 48.63385 | 19.40658 | 13.27008 | 43.87048 | 0.130299 | 37.93631 | 0.227015 | 15.77859 | 16.36057 |
| 2 | 1.66 | 10.20966 | 4.741126 | 13.9606 | 5.867104 | 2.789096 | 13.03618 | 0.110955 | 9.248515 | 0.172305 | 4.741126 | 4.502555 |
| 2 | 2.56 | 52.30182 | 20.93978 | 66.32474 | 22.4297 | 13.41736 | 57.71689 | 0.286618 | 48.20055 | 0.152835 | 20.93978 | 22.51531 |
| 2 | 2.6 | 53.59016 | 19.94954 | 65.26026 | 24.50474 | 22.6739 | 54.87077 | 0.119595 | 40.97578 | 0.27817 | 19.94954 | 17.79151 |
| 2 | 1.93 | 27.28557 | 11.96619 | 29.80866 | 13.34962 | 3.889505 | 29.03107 | 0.087337 | 26.36642 | 0.118157 | 11.96619 | 12.29474 |
| 2 | 1.99 | 23.68598 | 8.943856 | 29.19111 | 10.80351 | 5.798263 | 26.40329 | 0.221977 | 21.85758 | 0.157668 | 8.943856 | 10.19871 |
| 2 | 1.6 | 10.48576 | 3.99424 | 18.06336 | 7.056 | 3.5632 | 16.40687 | 0.162619 | 9.332314 | 0.161855 | 3.99424 | 4.931168 |
| 2 | 2.02 | 18.3014 | 7.2922 | 26.76419 | 9.250792 | 4.765187 | 23.59164 | 0.275115 | 17.00485 | 0.136044 | 7.2922 | 8.532769 |
| 2 | 2.14 | 29.2966 | 12.63649 | 36.32522 | 15.02815 | 3.72804 | 34.91426 | 0.161629 | 28.64401 | 0.087525 | 12.63649 | 14.35459 |
| 2 | 2.62 | 54.24055 | 19.95811 | 76.1165 | 26.32812 | 11.4956 | 67.68118 | 0.28534 | 51.58634 | 0.115445 | 19.95811 | 25.88266 |
| 2 | 2.57 | 47.74058 | 16.0625 | 64.76503 | 22.21405 | 17.47087 | 55.04079 | 0.238873 | 40.56727 | 0.205293 | 16.0625 | 18.88935 |
| 2 | 2.5 | 41.209 | 13.924 | 58.32225 | 21.17025 | 14.17309 | 51.13944 | 0.207814 | 35.80211 | 0.190745 | 13.924 | 17.19951 |
| 2 | 2.6 | 46.52154 | 15.35274 | 63.96416 | 21.866 | 15.81606 | 54.82052 | 0.253556 | 40.57953 | 0.187847 | 15.35274 | 19.1782 |
| 2 | 2.55 | 49.368 | 16.71168 | 68.1587 | 23.25702 | 10.56468 | 60.19612 | 0.29415 | 46.88229 | 0.117642 | 16.71168 | 23.27692 |
| 2 | 2.6 | 52.88426 | 18.67424 | 64.22234 | 22.78016 | 24.00629 | 52.19433 | 0.145609 | 38.9781 | 0.289636 | 18.67424 | 16.75713 |
| 2 | 2.51 | 37.398 | 12.37028 | 55.4459 | 17.75976 | 13.39453 | 46.12938 | 0.298705 | 32.63727 | 0.177712 | 12.37028 | 15.82076 |
| 2 | 2.42 | 24.7808 | 9.68 | 39.10817 | 13.70785 | 9.561464 | 33.61054 | 0.22596 | 21.18157 | 0.188215 | 9.68 | 10.55576 |
| 2 | 1.93 | 16.79583 | 7.642993 | 22.04909 | 9.172132 | 2.913788 | 21.60648 | 0.148505 | 16.1365 | 0.11314 | 7.642993 | 8.099894 |
| 2 | 2.73 | 78.13943 | 22.9593 | 98.93629 | 30.09115 | 32.22083 | 78.07729 | 0.297346 | 63.05947 | 0.234009 | 22.9593 | 27.71025 |
| 2 | 2.69 | 87.09171 | 28.9401 | 103.0703 | 31.0964 | 25.61674 | 83.89862 | 0.349009 | 77.97428 | 0.177959 | 28.9401 | 34.11987 |
| 2 | 2.63 | 60.34298 | 20.03429 | 79.26846 | 28.29459 | 17.78374 | 69.91958 | 0.235564 | 54.1386 | 0.17444 | 20.03429 | 25.49886 |
| 2 | 2.6 | 89.89344 | 26.45786 | 106.1635 | 29.87946 | 34.22102 | 81.1747 | 0.35837 | 74.54188 | 0.2243 | 26.45786 | 31.4936 |
| 2 | 2.52 | 35.62675 | 12.7575 | 60.5052 | 23.75075 | 13.74249 | 54.12946 | 0.139532 | 30.48844 | 0.18695 | 12.7575 | 15.73881 |

Figure 5A:
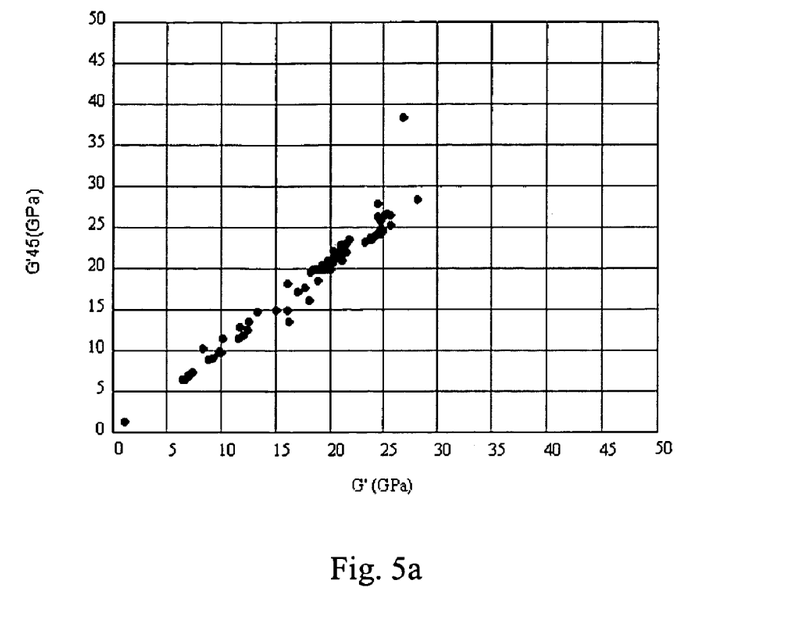
FIG. 5a is a diagram used to illustrate an embodiment of a correlation between two shear moduli G' and G'$_{45}$ of sand formation.
Figure 5B:
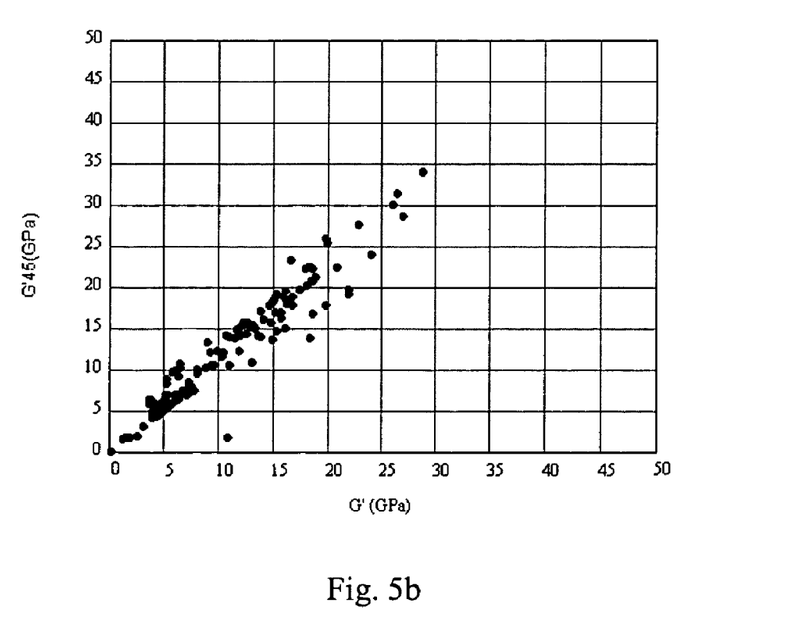
FIG. 5b is a diagram used to illustrate another embodiment of a correlation between two shear moduli G' and G'$_{45}$ of shale formation.

Results of G' and G'$_{45}$ are plotted in FIGS. 5a and 5b for data of sand formation and shale formation respectively. It can be concluded from FIGS. 5a and 5b that the value of the gain factor $f_{gain}$ is around 1.0. Therefore, it verifies the assumption that the shear modulus G' (parallel to TI symmetric axis) and shear module G'$_{45}$ in the plane that inclined to TI symmetric axis with about 45 degree are very close.

The statistical study has been carried out to build the correlation gain factor $f_{gain}$ versus formation type and Thomsen's parameter γ. The results are shown in Table 2.

TABLE 2

| Formation | Anisotropy parameter γ | Gain factor $f_{gain}$ | Uncertainty (%) (Standard Deviation) |
|---|---|---|---|
| Sand | 0~0.05 | 1.01 | +/−4 |
|  | 0.05~0.25 | 1.03 | +/−8 |
| Shale | 0~0.05 | 1.08 | +/−8 |
|  | 0.05~0.10 | 1.08 | +/−10 |
|  | 0.10~0.15 | 1.08 | +/−12 |
|  | 0.15~0.20 | 1.15 | +/−16 |
|  | 0.20~0.60 | 1.25 | +/−25 |

Figure 6A:
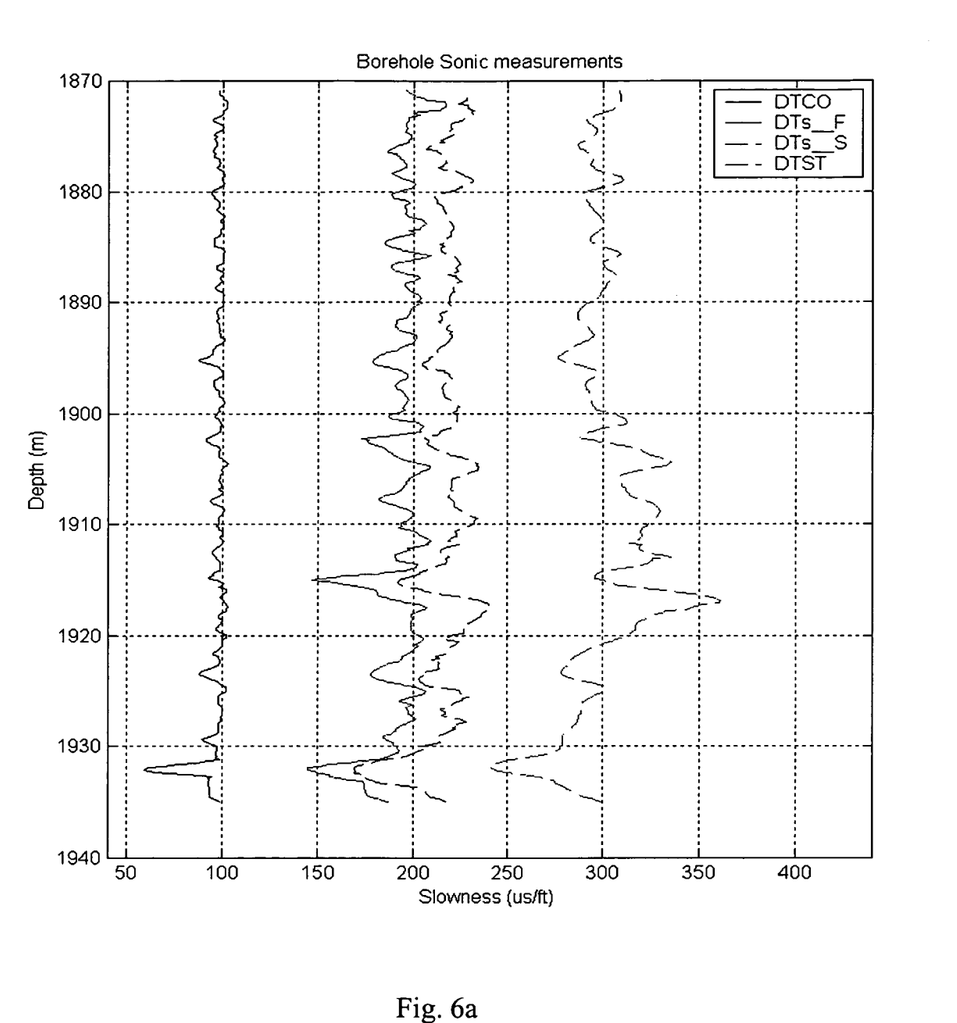
FIG. 6a is a diagram of a sample of four velocities measured from sonic tool of wireline logging device.
Figure 6B:
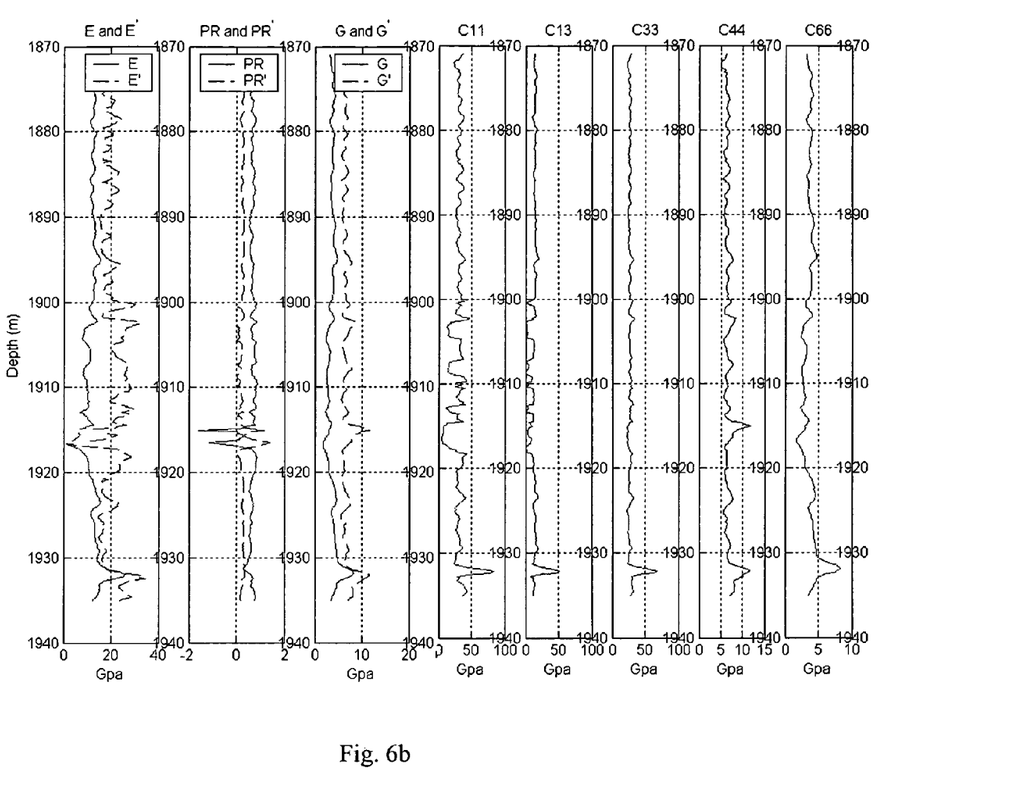
FIG. 6b is a diagram of TI formation elastic moduli calculated from the measurements form the borehole after applying the present invention.

A case study has been attached to demonstrate the process of determining the TI formation elastic properties using the above invention. Specifically, we used the field measurement of sonic data from SONIC SCANNER of Schlumberger (as shown in FIG. 6a) and applied equations (15)-(19) to derive the TI elastic constants, and further use equations (10) to (14) to derive the elastic moduli E, E', $\upsilon$, $\upsilon'$ (Poisson ratios PR and PR' here) and G' (as shown in FIG. 6b).

Figure 7:
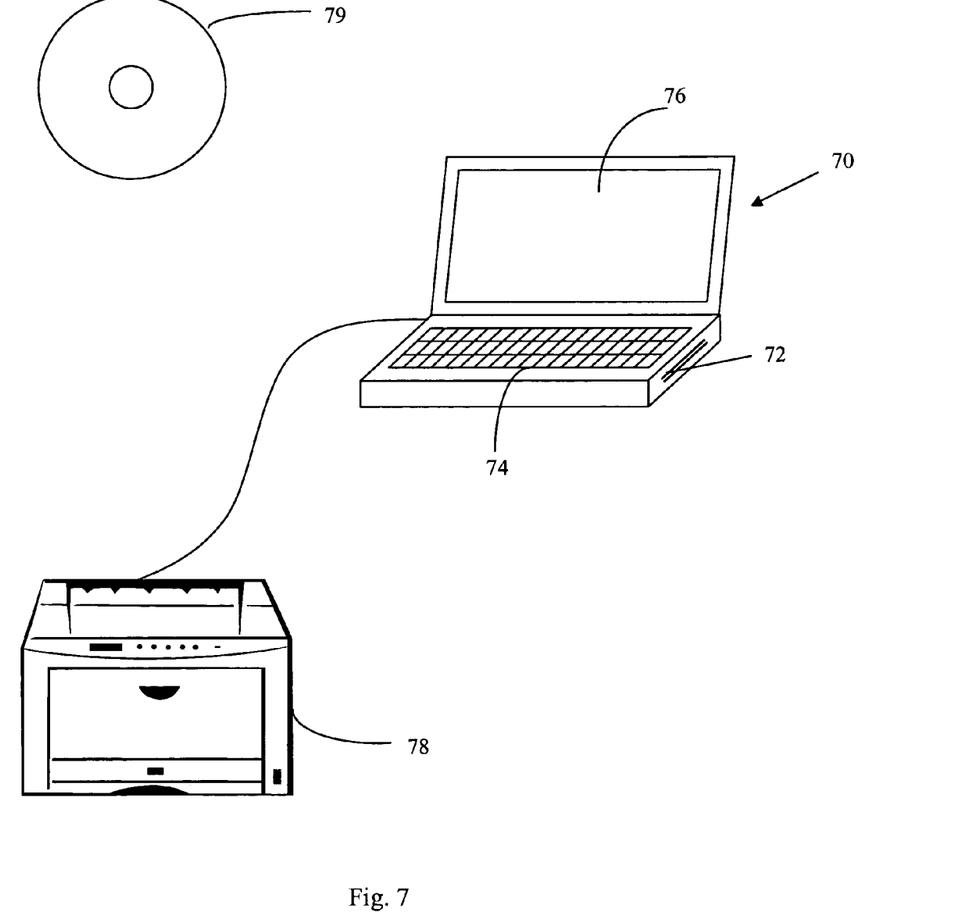
FIG. 7 is a schematic illustration of computer hardware associated with the apparatus and article of manufacture.

FIG. 7 schematically illustrates computer hardware that may be used to implement the inventive method. Computer 70 has a media reading device, such as a CD-ROM Reader 72, a floppy disk device, or a ZIP drive. The media reading device may also be capable of recording the output of the program the computer 70 is running. A user of the computer 70 may enter commands using a user input device, such as a keyboard 74 or a mouse, may view output of the program code on a visual display device, such as monitor 76, and may make hardcopies of output using an output device, such as printer 78. When properly configured, computer 70 (and its associated peripheral devices) is an apparatus for outputting the elastic moduli E, E', $\upsilon$, $\upsilon'$ and G' directly from borehole measurement in accordance with the present invention. Computer media, such as a CD-ROM 79, a floppy disk, or a ZIP disk, may have computer readable program code that allows the computer 70 to output the elastic moduli E, E', $\upsilon$, $\upsilon'$ and G' directly from borehole measurement in accordance with the inventive method.

The foregoing description of the preferred and alternate embodiments of the present invention has been presented for purposes of illustration and description. It is not intended to be exhaustive or limit the invention to the precise examples described. Many modifications and variations will be apparent to those skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

| Symbol | Definition |
|---|---|
| E and E' | Young's moduli |
| υ and υ' | Poisson ratio |
| G and G' | shear modulus |
| $\sigma_{ij}$ | stress |
| $\epsilon_{kl}$ | elastic strain |
| $C_{ij}$ | stiffness parameter |
| $V_P$ | formation compressional velocity |
| $V_T$ | tube wave velocity |
| $V_{SH}$ | shear horizontal wave velocity |
| $V_{SV}$ | shear vertical wave velocity |
| θ | angle |
| ρ | rock mass density |
| $\rho_f$ | borehole fluid density |
| a | compliance tensor |
| c | stiffness tensor |
| $f_{gain}$ | gain factor |
| b | transformation tensor |
| γ | Thomsen's parameter |
| $X'_1 X'_2 X'_3$ | borehole coordinate system axis |

We claim:

1. A method of transversely isotropic (TI) formation evaluation comprising:
receiving a plurality of borehole measurements using a computer;
deriving a correlation between a first TI stiffness parameter and other TI stiffness parameters using the computer; said first and other TI stiffness parameters representing mechanical behavior of said TI formation; and
computing said first and other TI stiffness parameters based on said borehole measurements and said derived correlation using the computer.

2. The method of claim 1 further comprising evaluating TI formation elastic properties based on said computed first and other TI stiffness parameters.

3. The method of claim 2, wherein said TI formation elastic properties are represented by elastic moduli including Young's modulus in the plane orthogonal to TI symmetric axis (E), Young's modulus parallel to TI symmetric axis (E'), Poisson ratio (υ) in the plane orthogonal to TI symmetric axis, Poisson ratio (υ') parallel to TI symmetric axis, and shear modulus parallel to TI symmetric axis (G').

4. The method of claim 3 further comprising calculating elastic moduli E, E', υ, υ' and G'.

5. The method of claim 1, wherein deriving a correlation includes deriving an equation $$\frac{1}{f_{gain}c_{44}} = \frac{(c_{33}c_{11}) - (c_{13} - 2c_{66})^2 + 4c_{11}c_{66}}{4c_{66}((c_{11} - c_{66})c_{33} - c_{13}^2)},$$

where $c_{11}$, $c_{33}$, $c_{44}$, $c_{66}$ and $c_{13}$ represent TI stiffness parameters and $f_{gain}$ is a gain factor.

6. The method of claim 5 further comprising deriving said gain factor $f_{gain}$.

7. The method of claim 1 wherein a shear modulus parallel to a TI symmetric axis is determined from other moduli.

8. The method of claim 1 wherein a Shear Modulus G' (parallel to TI symmetric axis) is proportional to a shear modulus in the plane inclined within about 45 degrees to a TI symmetric axis.

9. The method of claim 1 wherein a shear modulus parallel to TI symmetric axis is determined from other moduli.

10. The method of claim 1 wherein a shear modulus parallel to TI symmetric axis is determined from other moduli with test data.

11. The method of claim 1, wherein said borehole measurements include borehole internal velocities.

12. The method of claim 1, wherein said borehole measurements include borehole sonic measurements from a tool using acoustic technology.

13. The method of claim 1, wherein said borehole measurements include borehole seismic measurements.

14. The method of claim 1, wherein said borehole measurements include a formation compressional velocity ($V_P$), a tube wave velocity ($V_T$), a shear horizontal wave velocity ($V_{SH}$), and a shear vertical wave velocity ($V_{SV}$).

15. The method of claim 1, wherein said borehole measurements further include an angle (θ) that the borehole is deviated from formation isotropic axis.

16. The method of claim 1, wherein said borehole measurements further include rock mass density ρ, borehole fluid velocity $V_f$ and fluid density $\rho_f$.

17. An apparatus for transversely isotropic (TI) formation evaluation comprising:
means for receiving a plurality of borehole measurements;
means for deriving a correlation between a first TI stiffness parameter and other TI stiffness parameters; said first and other TI stiffness parameters representing mechanical behavior of said TI formation; and
a processor computing said first and other TI stiffness parameters based on said borehole measurements and said derived correlation.

18. The apparatus of claim 17 further comprising means for evaluating TI formation elastic properties based on said computed first and other TI stiffness parameters.

19. The apparatus of claim 17, wherein means for deriving a correlation includes means for deriving an equation $$\frac{1}{f_{gain}c_{44}} = \frac{(c_{33}c_{11}) - (c_{13} - 2c_{66})^2 + 4c_{11}c_{66}}{4c_{66}((c_{11} - c_{66})c_{33} - c_{13}^2)},$$

where $c_{11}$, $c_{33}$, $c_{44}$, $c_{66}$ and $c_{13}$ represent TI stiffness parameters and $f_{gain}$ is a gain factor.

20. The apparatus of claim 19 further comprising means for deriving said gain factor $f_{gain}$.

21. An article of manufacture, comprising:
a non-transitory computer usable medium having a computer readable program code means embodied therein for transversely isotrophic (TI) formation evaluation, the computer readable program code means in said article of manufacture comprising:
computer-readable program means for receiving a plurality of borehole measurements;
computer-readable program means for deriving a correlation between a first stiffness parameter and other TI stiffness parameter; said first and other TI stiffness parameters representing mechanical behavior of said TI formation; and computer-readable program means for computing said first and other TI stiffness parameters base on said borehole measurements and said derived correlation.

22. The method of claim 2 further comprising using the evaluated TI formation elastic properties to model the TI formation.

23. The method of claim 22 wherein the model of the TI formation is used to determine optimal production rates of the TI formation that avoids subsidence of the TI formation.

24. The method of claim 23 further comprising applying the optimal production rates to produce the TI formation.

* * * * *